United States Patent
Averill et al.

(10) Patent No.: US 10,093,523 B2
(45) Date of Patent: Oct. 9, 2018

(54) PROGRAMMABLE CONTROLS FOR A WINCH

(71) Applicant: Warn Industries, Inc., Clackamas, OR (US)

(72) Inventors: Bryan Averill, Portland, OR (US); Darren Fretz, Oregon City, OR (US); Kevin Talmadge, Portland, OR (US); Ian Wendler, Portland, OR (US)

(73) Assignee: WARN INDUSTRIES, INC., Clackamas, OR (US)

( * ) Notice: Subject to any disclaimer, the term of this patent is extended or adjusted under 35 U.S.C. 154(b) by 467 days.

(21) Appl. No.: 14/852,298

(22) Filed: Sep. 11, 2015

(65) Prior Publication Data

US 2016/0096709 A1   Apr. 7, 2016

Related U.S. Application Data

(60) Provisional application No. 62/060,296, filed on Oct. 6, 2014.

(51) Int. Cl.
| | |
|---|---|
| *B66D 1/40* | (2006.01) |
| *B66D 1/48* | (2006.01) |
| *B66D 1/12* | (2006.01) |
| *B66D 1/00* | (2006.01) |
| *H02P 29/032* | (2016.01) |

(52) U.S. Cl.
CPC .............. *B66D 1/485* (2013.01); *B66D 1/00* (2013.01); *B66D 1/12* (2013.01); *H02P 29/032* (2016.02)

(58) Field of Classification Search
CPC . B66D 1/12; B66D 1/36; B66D 1/485; B66D 1/505; B66D 1/54; H02P 29/032; H02P 29/40; H02P 29/60
See application file for complete search history.

(56) References Cited

U.S. PATENT DOCUMENTS 2,406,781 A * 9/1946 Lewis .................... H02P 25/18
                                                                318/257
3,481,584 A * 12/1969 Robertson ................ B66D 1/08
                                                                254/268

(Continued)

FOREIGN PATENT DOCUMENTS

DE    102007055136 A1    1/2009
EP       0841743 A2       5/1998

(Continued)

OTHER PUBLICATIONS

Swedish Patent and Registration Office, Office Action and Search Report Issued in Patent Application No. 1551269-2, dated Jun. 20, 2017, 9 pages.

(Continued)

*Primary Examiner* — Emmanuel M Marcelo
(74) *Attorney, Agent, or Firm* — K&L Gates LLP

(57) ABSTRACT

Methods and systems are provided for adjusting operation of a motor of a winch. In one example, a system for a winch includes a controller adapted to adjust operation of a motor of the winch based on one or more of and/or each of a winch load limit, a motor temperature, a distance of a hook coupled to an end of a rope of the winch to a winch fairlead, and an amount of rope wound onto a drum of the winch.

20 Claims, 8 Drawing Sheets

(56) References Cited

U.S. PATENT DOCUMENTS

| | | | | |
|---|---|---|---|---|
| 3,838,846 A * | 10/1974 | Ostrom | ................... | B66D 1/48 |
| | | | | 254/275 |
| 4,145,645 A * | 3/1979 | Price | ...................... | B66C 13/26 |
| | | | | 318/762 |
| 5,648,887 A * | 7/1997 | Herndon | ................ | H02H 7/085 |
| | | | | 361/31 |
| 6,046,893 A * | 4/2000 | Heravi | ................... | H02H 7/085 |
| | | | | 318/434 |
| 6,864,650 B2 | 3/2005 | Heravi et al. | | |
| 7,262,947 B2 | 8/2007 | Heravi et al. | | |
| 7,850,145 B2 | 12/2010 | Heravi et al. | | |
| 8,076,885 B2 | 12/2011 | Heravi et al. | | |
| 8,585,021 B2 | 11/2013 | Elliott et al. | | |
| 9,315,364 B2 | 4/2016 | Averill et al. | | |
| 2004/0263100 A1* | 12/2004 | Heravi | ...................... | B60P 3/12 |
| | | | | 318/280 |
| 2007/0103821 A1* | 5/2007 | Huang | ................ | H02H 7/0852 |
| | | | | 361/26 |
| 2007/0274427 A1* | 11/2007 | Jullien | ...................... | B66D 1/58 |
| | | | | 376/268 |
| 2010/0314182 A1* | 12/2010 | Crain | ....................... | B60K 1/04 |
| | | | | 180/60 |
| 2012/0206074 A1 | 8/2012 | Kureck et al. | | |
| 2014/0091268 A1* | 4/2014 | Heravi | ................... | B66D 1/505 |
| | | | | 254/274 |
| 2014/0264210 A1 | 9/2014 | Heravi et al. | | |
| 2015/0307332 A1* | 10/2015 | Huang | ..................... | B66D 1/28 |
| | | | | 254/323 |

FOREIGN PATENT DOCUMENTS

| | | | | |
|---|---|---|---|---|
| GB | 2512315 A | | 10/2014 | |
| JP | 201578711 A | * | 4/2015 | ............ B66C 13/20 |
| WO | 2010133876 A1 | | 11/2010 | |
| WO | 2013059862 A1 | | 5/2013 | |

OTHER PUBLICATIONS

"Polaris Pro HD Winch Upgrade Kit-2500 LB. & 3500 LB.," Polaris ATV Store Website, Available Online at www.polaris.com/en-us/atv-quad/shop/accessories/polaris-pro-hd-winch-upgrade-kit-2500lb-3500lb/pid-2879149, Available as Early as Jul. 16, 2014, Retrieved on Sep. 5, 2014, 2 pages.

Swedish "final notice" for related Swedish Application No. 1551269-2; action dated Mar. 13, 2018; (46 pages).

* cited by examiner

PROGRAMMABLE CONTROLS FOR A WINCH

CROSS REFERENCE TO RELATED APPLICATIONS

The present application claims priority to U.S. Provisional Patent Application No. 62/060,296, "PROGRAMMABLE CONTROLS FOR A WINCH," filed on Oct. 6, 2014, the entire contents of which are hereby incorporated by reference for all purposes.

FIELD

The present application relates generally to systems and methods for controlling a winch.

SUMMARY/BACKGROUND

Vehicles, such as powersports vehicles, commercial/utility trucks used in construction and by contractors, tow trucks, and other utility vehicles are often equipped with auxiliary systems (e.g., accessories) such as winches, plows, lights, and compressors. Winches may be pre-programmed during manufacturing to operate within certain mechanical and electrical operating limits. For example, winch operation may be constrained within a set current limit that may relate to a pulling force of the winch. As such, the winch may not operate above a set winch pulling force or supply current. As another example, a rotational speed of a drum of the winch may be based on the tension of the winch rope. Pre-set winch operation may cause the winch drum to rotate at a higher speed when the tension on the winch rope is lower as compared to when the tension of the winch rope is higher. Further, the winch speed may be based on a pre-set motor performance curve and may not be adjustable during winch operation. Non-adjustable and pre-set winch operating ranges and parameters may result in decreased winch performance during certain winch applications.

Thus in one example, the above issues may be at least partially addressed by a system for a winch including a controller adapted to adjust operation of a motor of the winch based on a load limit, the load limit automatically set by the controller to different levels depending on a mode of the winch. In this way, a controller may adjust winch motor operation based on a load limit based on a winch mode, thereby increasing the efficiency and reducing degradation of the winch, even when operating in different winching modes.

In another example, the above issues may be at least partially addressed by a method for adjusting a motor of the winch based on a load limit, the load limit automatically set by a winch controller to different levels depending on a mode of the winch. In this way, the motor of the winch may be adjusted based on different operating modes of the winch. As a result, winch performance may be tailored to specific winch applications, thereby resulting in increased winch performance.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following detailed description relates to systems and methods for adjusting winch motor operation based on an intended use of the winch and/or winch operating parameters. A winch, such as the winch shown in FIG. 1, may include a control module with instructions for adjusting winch operation. Further, one or more auxiliary systems (or devices), separate from the winch, may be electrically coupled with the winch control module. For example a plow may be installed on a same vehicle as a winch and be electrically coupled with the winch control module. As such, the winch control module may adjust operation of the auxiliary systems by sending control signals (e.g., commands) to the auxiliary systems. In one example, both winch operation and auxiliary system operation may be controlled with a controller in communication with the winch control module, as shown by the schematic in FIG. 2. Through the series of buttons and displays of a user interface, the winch control module may allow a user to select from a variety of activity modes that will adjust motor operation to appropriately power the winch for the desired activity as shown by the flow chart in FIG. 7. As an example, a user could select a constant load mode which would adjust winch motor voltage and/or current to provide a constant pulling force, as shown in FIG. 8. However, all optional activity modes would operate under the constraints of certain upper thresholds or pre-set limits for motor temperature, load, and hook proximity to the fairlead, so as to protect the winch from potential damage, as shown by the flow charts in FIGS. 4-6. Thus, the following description relates to systems and methods for providing a seamless integration of safety features and elective activity modes for a winch, as shown by the flow chart in FIG. 3.

Figure 1:
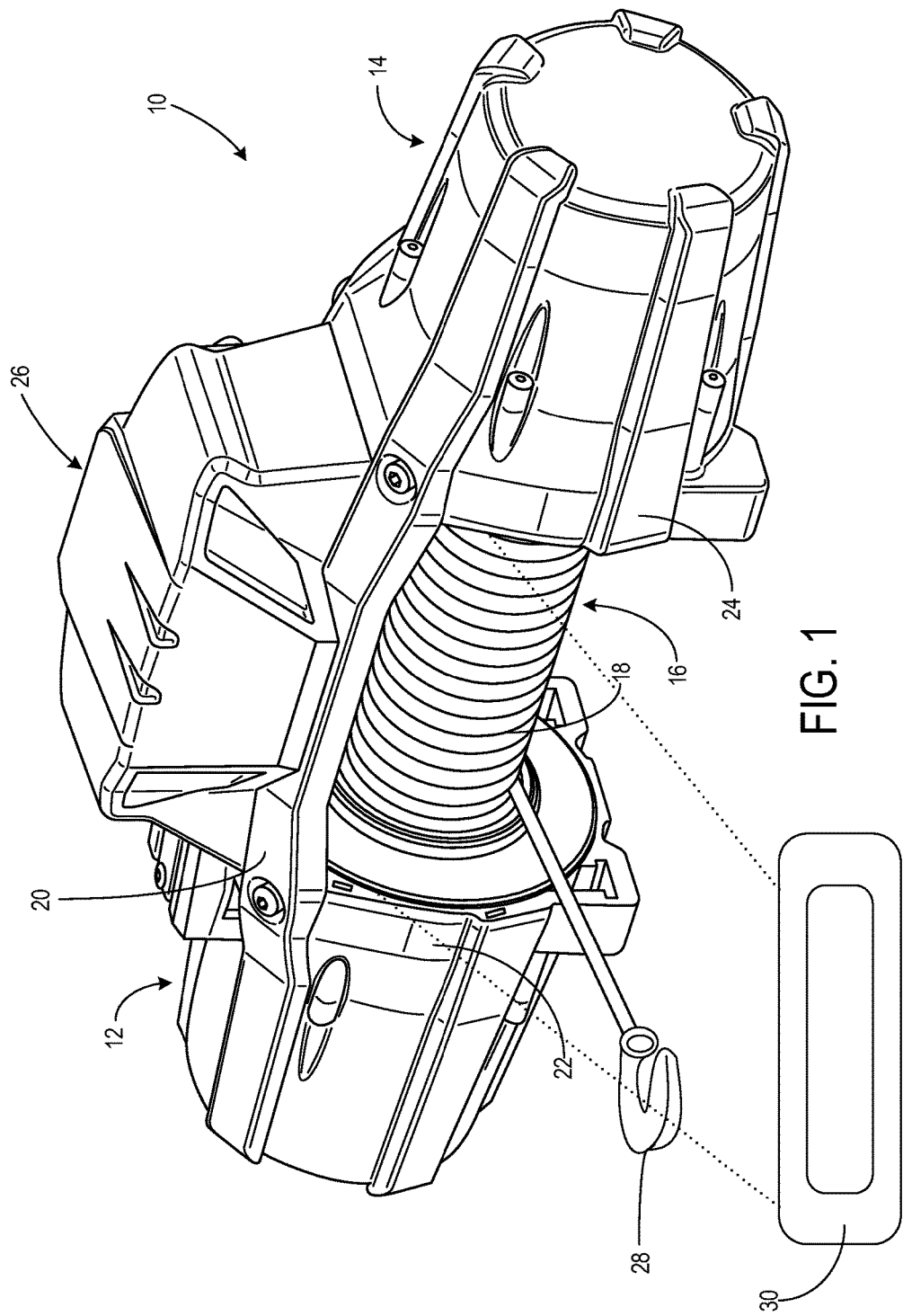
FIG. 1 shows a first embodiment of a winch.

FIG. 1 shows an embodiment of a winch 10 that may be used in the control system shown in FIG. 2 and adjusted using the methods described further below. As such, the methods described below with regard to FIGS. 3-8 may be used to adjust motor operation of the winch embodiment shown in FIG. 1 or another type winch or hoist system. FIG. 1 shows perspective view of a front side of a first embodiment of a winch 10. The winch 10 includes a motor assembly 12 drivingly connected to a gear reduction unit 14. The motor assembly 12 includes a motor for operating the winch 10. The motor may be powered by a battery of a vehicle to which the winch 10 is installed, as described further below. For example, the winch 10 may be coupled to a front end of the vehicle. The motor provides power to the gear reduction unit 14 and the gear reduction unit 14 (e.g., transmission of the winch 10) provides driving torque to a rotatable drum 16. The gear reduction unit 14 may include a remote controlled clutch inside the end housing. As shown in FIG. 1, the rotatable drum 16 is a cylinder. A cable 18 (e.g., rope) with a hook 28 at its end may be wound onto, or off from, the rotatable drum 16 to provide various pulling operations. For example, based on the direction of rotation of the drum, the cable 18 may be wound out from (e.g., off the drum) or into (e.g., into the drum) the winch 10. A fairlead 30 guides the cable 18 and acts as a secure stopping point for the hook 28 when being pulled in. In one example, the fairlead 30 may be attached to the front of the winch. More specifically, the fairlead 30 may be positioned in front of the drum 16 and may prevent the hook 28 from being pulled all the way inside the winch 10 and onto the drum 16. In another example, the fairlead 30 may be attached to the foremost position of the vehicle (e.g., a vehicle front end), in front of the winch 10 and drum 16. The fairlead 30 may be a rectangular plate with a slit wide enough to allow the cable 18 to pass through. However, the slit (e.g., opening) may be small enough to prevent the hook 28 from passing through the opening.

A tie plate 20 may be disposed for connection between a first drum support 22 of the motor assembly 12 and a second drum support 24 of the gear reduction unit 14. A control until 26 may be removably mounted to the tie plate 20. The control unit 26 provides electrical connections and component mounting in a single enclosure. In one example, the control unit 26 is mounted to the tie plate 20. In another example, the control unit 26 is mounted a short distance away from the winch 10 by using a remote mounting kit. The first drum support 22 and the second drum support 24 provide a bearing support structure for rotatably supporting the rotatable drum 16.

In one example, the winch 10 shown in FIG. 1 may be installed on a vehicle such as a truck or another type of commercial vehicle.

Figure 2:
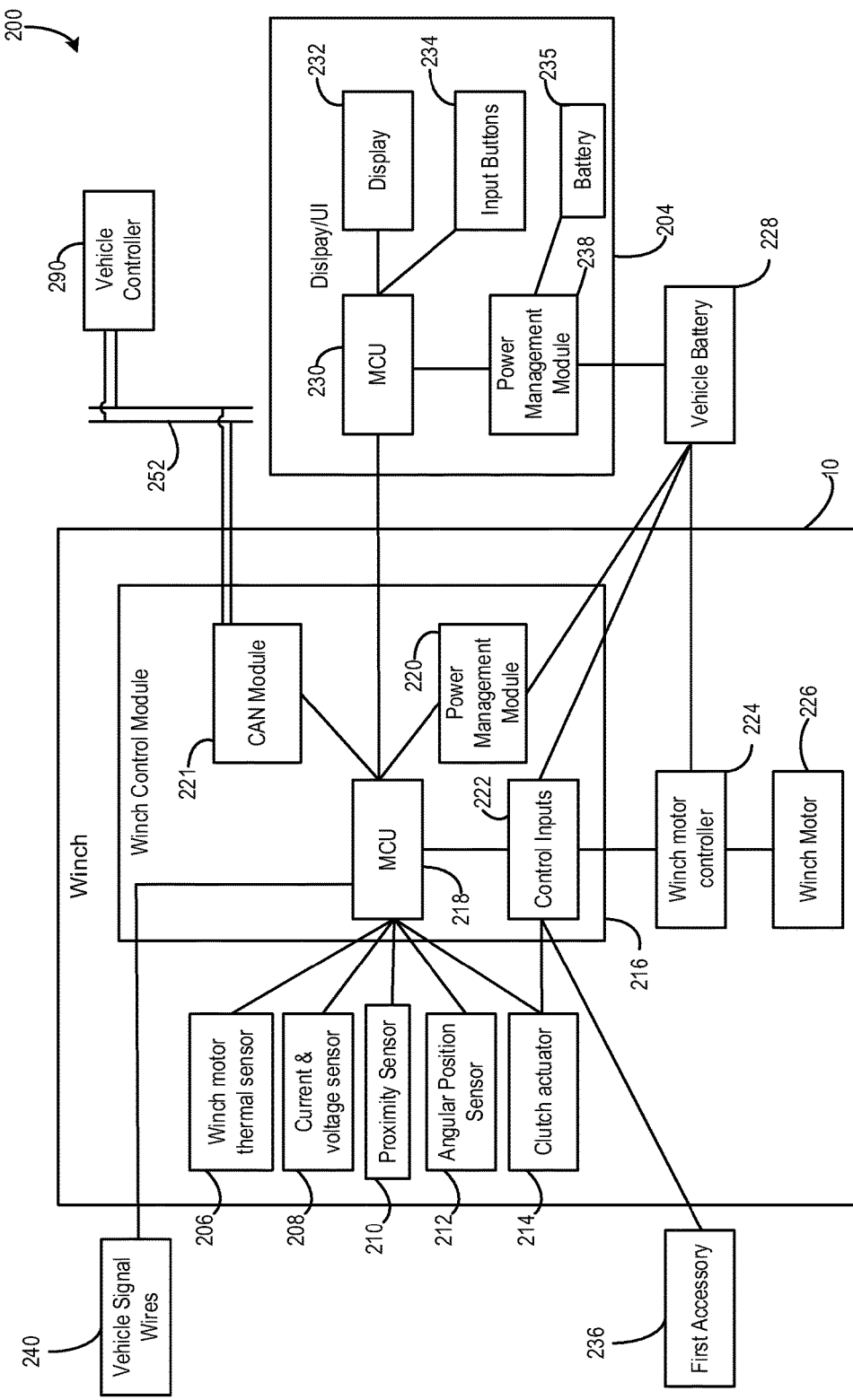
FIG. 2 shows a schematic diagram of a winch control system.

Turning to FIG. 2, a schematic 200 shows a diagram of a winch 10 (shown in FIG. 1) and accessory control system. The system includes a winch 10 electrically coupled to a user input portion 204. In FIG. 2, the solid lines between system components represent physical electrical connections between the components. However, in some examples, one or more of these electrical connections may be two-way wireless connections between the connected components. More specifically, the winch 10 includes components of a winch (such as the components of winch 10 shown in FIG. 1) including a winch control module 216 and one or more accessories which are coupled to a vehicle in which the winch is installed. As one example, the winch control module 216 resides within the control unit 26 (shown in FIG. 1) which may be on or near the winch 10. The user input portion 204 may be mounted inside the vehicle such as on the dashboard, handlebars, roll bars, or another vehicle location, and provide control signals to the winch control module 216 and receive feedback signals from the winch control module 216. In another example, the user input portion 204 may be a wireless remote or another type of wireless user interface. It should also be noted that the winch control module 216 may communicate either wirelessly or through a wired electrical connection with a controller of the vehicle in which it is installed.

The winch portion (e.g., winch) 10 includes a winch motor 226 which is positioned within the motor assembly 12 of the winch 10. A winch motor thermal sensor 206 may be coupled to the motor and measure a temperature of the winch (e.g., a motor temperature). The winch 10 may also include a current and/or voltage sensor 208, a hook proximity sensor (e.g., fairlead sensor) 210 coupled to the fairlead 30 and/or hook 28 for measuring a distance between the hook and fairlead, an angular position sensor (e.g., layer sensor) 212 which may be coupled to the drum 16, and/or a freespool clutch actuator 214 coupled to the winch. When the clutch of the winch 10 is disengaged from the winch transmission (e.g., gear reduction unit 14) the drum may rotate freely without input from the gear reduction unit and motor. As such, the drum may be in a freespool position. In one example, the clutch actuator 214 is an electrical device such as an electrical solenoid for shifting the winch transmission into a disengaged state to move the drum into the freespool position and for shifting the transmission back into an engaged state with the drum for normal winch powering in or powering out (e.g., winching). Additionally, the winch 10 may include one or more accessories coupled to the vehicle. FIG. 2 shows a first accessory (e.g., first auxiliary system) 236.

As described above, the winch control module 216 is included in the control unit 26 (shown in FIGS. 1-2) of the winch 10. The control unit 26 of the winch 10 also includes a winch motor controller 224. Both the winch motor controller 224 and the winch control module 216 are connected to a vehicle battery 228. The winch control module 216 provides control signals to the winch motor controller 224 which may supply current from the vehicle battery 228 and to the winch motor 226. The winch control module 216 also controls the clutch actuator 214, as described above. Additionally, an accessory such as the first accessory 228 may be connected to the control module 216 at control inputs 222 of the control module 216 via an electrical coupling to an auxiliary port or another type of electrical connection. The control inputs 222 may further include a winch contactor control input that communicates with the winch controller 224. Additionally, the control inputs 222 may include a winch clutch actuator input for communicating with the clutch actuator 214.

The winch control module 216 further includes a microcontroller unit (MCU) 218 containing programmable data for operating the winch components and the plurality of accessories coupled to the winch control module 216. For example, the winch control module 216 may provide control signals to the first accessory 236 via the MCU 218 and the first accessory 236 may provide feedback signals to the MCU 218 of the winch control module 216. Further, the winch control module 216 may provide an electrical connection between the vehicle battery 228 and the first accessory 236 through the associated control inputs.

The winch 10 may also be in communication with a vehicle Controller Area Network (CAN) bus 252 for providing communication between the winch control module 216 and a vehicle controller 290. The CAN bus 252 may exchange information using a scheduled periodic rate. Specifically, the winch control module 216 may include a CAN module 221, electrically coupled to the MCU 218, for providing electronic communication between the winch control module 216 and the CAN bus 252. The CAN module 221 may convert signals received from the MCU 218, into a CAN data stream, which may then be transmitted to the controller 290 via the CAN bus 252. Likewise, the CAN module may convert and relay the CAN data stream received from the controller 290 into an electrical signal interpretable by the MCU 218. CAN bus 252 may therefore provide electronic communication between the vehicle controller 290, and the CAN module 221.

By connecting the winch control module 216 to the CAN bus 252, operation of the winch 10 may be adjusted based on a model of a vehicle to which the winch 10 is coupled and/or based on vehicle operating parameters. For example, the winch load rating may be adjusted based on a model of a vehicle to which the winch 10 is coupled. Adjusting the winch load rating based on the model of the vehicle may increase the accuracy of estimations of the winch load rating. In this way, output of the winch 10 may be increased while reducing degradation of the winch 10. Further, operation of the winch 10 may be adjusted based on vehicle operating parameters such as any one or more of vehicle speed, vehicle incline, steering angle, engine temperature, brake pressure, engine load, charge state of the battery 228, and current and/or voltage output from the battery 228, etc. Specifically, one or more of the winch speed limit, load limit, and temperature limit may be adjusted based on vehicle operating parameters. By adjusting winch operation based on the vehicle operating conditions, winch performance may be increased under various vehicle operating conditions, and degradation to the winch 10 may be reduced.

Additionally or alternatively, vehicle operation may be adjusted based on current winch operating conditions. For example, the idle speed of the vehicle may be increased in response to powering on the winch 10, and/or winch load increasing above a threshold. Further, vehicle accessories may be turned on or off in response to changes in the winch speed, load, motor temperature, current and/or voltage draw, charge state of the battery 228, and current and/or voltage output from the battery 228, etc. By adjusting vehicle operation and/or power supplied to vehicle accessories based on current winch operating conditions, winch performance may be increased, and an amount of electrical power drained from the battery 228 may be reduced. Said another way, the energy efficiency of the winch and vehicle may be increased by coupling the winch 10 to the CAN bus 252.

The winch 10 may additionally or alternatively be electrically coupled to a portion or all of vehicle signal wires 240. Specifically, the MCU 218 of the winch control module 216 may be electrically coupled to all or a portion of the vehicle signals wires 240. By coupling the winch 10 to the vehicle signal wires 240, winch operation may be adjusted based on vehicle operating parameters. As an example, the MCU 218 may be electrically coupled to a turn signal circuit of the vehicle signals wires 240. In this way, the winch 10 may only be powered on when an ignition of the vehicle is turned on. In another example, the winch load limit may be adjusted via a dashboard switch. Thus, a vehicle operator may adjust the winch load limit by manipulating a dashboard switch on a dashboard of the vehicle. A power management module 220 of the winch control module 216 may distribute power from the vehicle battery 228 to the winch motor 226 and first accessory 236. Additionally, the winch control module 216 may switch on or off the winch 10 and accessory (e.g., first accessory 236) electric power according to input commands received from the user input portion 204. The control programming for operating the power management module 220 resides within the MCU 218 of the winch control module 216.

In one embodiment, the communication between the winch control module 216 and the user input portion 204 may be performed by a wired connection from the winch to the vehicle and in another embodiment this connection could be wireless.

Figure 3:
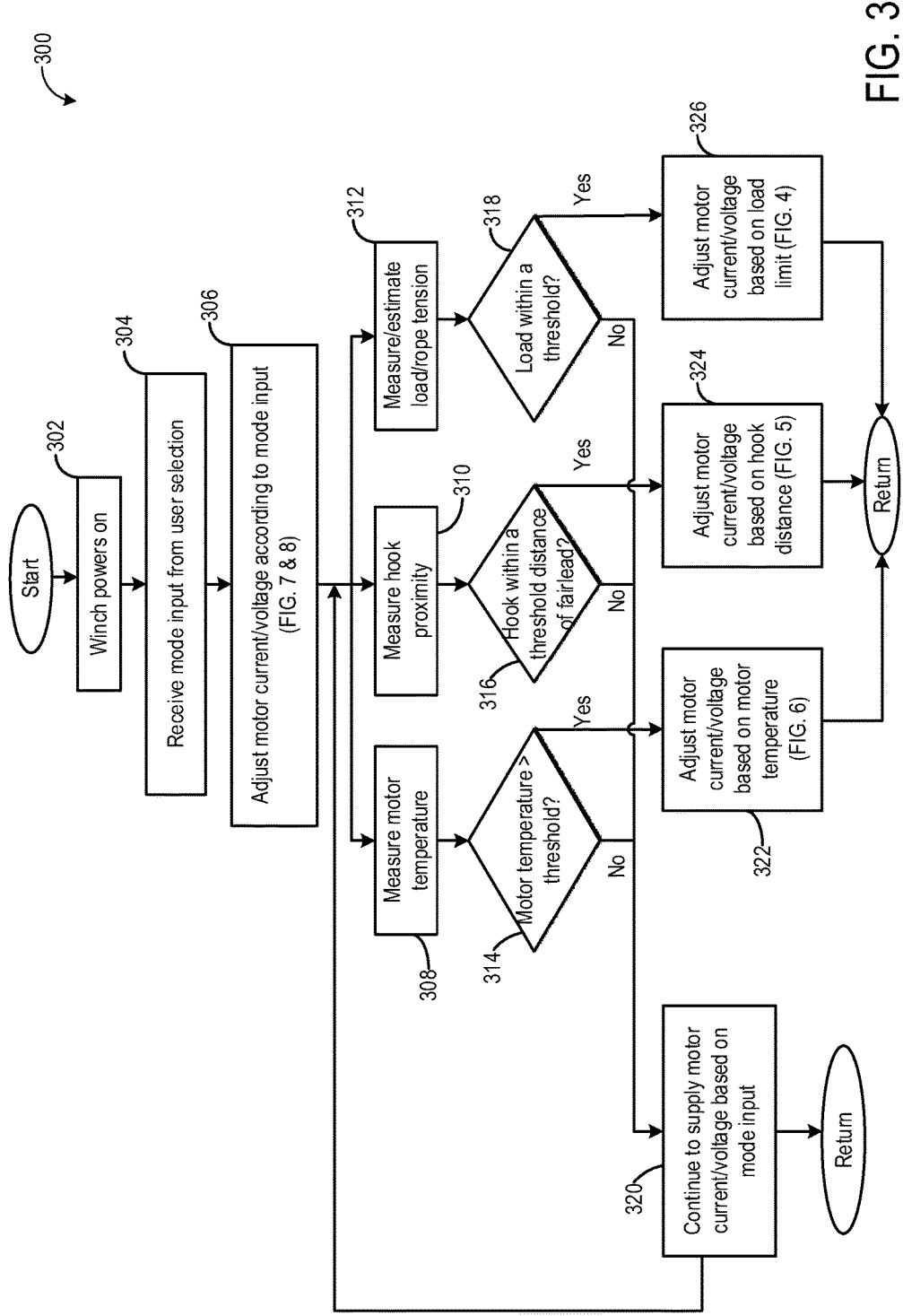
FIG. 3 shows a flow chart of a method for adjusting motor operation of a winch.

The user input portion 204 also includes a microcontroller unit (MCU) 230 for generating control signals to be sent to the winch 10. The MCU 230 may contain programmable data (e.g., stored on a memory of the MCU 230) for processing inputs received from one or more of a display 232 and input buttons 234 of the user input portion 204. The MCU 230 may then send signals corresponding to the received inputs to the MCU 218 of the winch control module 216, which may in turn accordingly adjust operation of the winch and/or accessories. Additionally, the user input portion 204 includes a power management module 238 which may be electrically coupled to the vehicle battery 228. However, in another example, the user input portion 204 may include its own dedicated battery 235, which may be coupled to the power management module 238 for providing electrical power to the user input portion 204. Thus, in some examples, the power management module 238 may be not be coupled to the vehicle battery 228 and may draw electrical power from only the battery 235. In such examples, the user input portion 204 may be wirelessly connected to the winch control module 216. In FIG. 3, a schematic shows an overview of a method 300 for operation of the winch (e.g., winch 10 shown in FIGS. 1-2). Instructions for carrying out method 300 may be stored in the memory of a control module of the winch (e.g., winch control module 216 shown in FIG. 2). As such, the winch control module may carry out method 300. As discussed above, control signals may be received at the winch control module from a user input portion such as a wired or wireless user interface including one or more of a display and series of input buttons. In one example, the user interface of the winch may be a remote user interface wirelessly coupled to the winch control module. In another example, the winch user interface may be coupled to a vehicle in which the winch is installed.

Method 300 begins at step 302 by powering on the winch following receiving a power-on signal at the winch control module from a manual switch of the winch or various input buttons of the winch user interface (e.g., input buttons 234 shown in FIG. 2). Method 300 continues on to step 304 at which point the winch control module receives a mode input from the user. For example, a user may select a desired winch operation mode from a series of mode selections via the user interface. The control module may then receive a signal from the user interface specifying which operating mode has been selected. In one embodiment, a mode must be selected in order for the winch to be operated. In this embodiment, a standard mode may be chosen that would adjust operation of the winch based on a standard performance curve of the winch motor. For example, the winch control module may adjust winch motor operation within a series of standard motor voltage and current ranges based on winch operating parameters. In one example, the standard operating mode may be a winching mode. In another embodiment, the winch control module may automatically engage in the standard operational mode if no mode input is received.

Once a mode input is received at step 304 (or the standard operating mode is automatically selected), method 300 proceeds to step 306 where the current and/or voltage supplied to the winch motor are adjusted to pre-set levels by the winch control module, as further described further below by the methods in FIGS. 7 and 8, to provide a pulling force and/or speed specified by the selected mode. For example, at 306, the winch control module may adjust motor operation based on motor current and/or voltage thresholds or operating ranges for each mode selection. Immediately thereafter, steps 308, 310, and 312 may be executed simultaneously.

The control module may measure: the load on the winch (e.g., winch rope tension or pulling force) at step 312, temperature of the winch motor at step 308, and the distance of a winch hook (e.g., hook 28 shown in FIG. 1) to a winch fairlead (e.g., fairlead 30 shown in FIG. 1), also referred to herein as the hook proximity to the fairlead, at step 310. These parameters are measured using data gathered from a plurality of sensors, as described in greater detail by the methods in FIGS. 4-6. For example, the motor temperature at 308 may be measured by a motor temperature sensor (e.g., winch motor thermal sensor 206 shown in FIG. 2), the hook proximity at 310 may be measured by a hook proximity sensor (e.g., proximity sensor 210 shown in FIG. 2), and the winch load and/or rope tension may be measured at least partially based on a winch motor current and voltage sensor (e.g., current and voltage sensor 208 shown in FIG. 2).

At step 314, the winch control module determines if the winch motor temperature measured in step 308 is greater than a threshold temperature. If the motor temperature is greater than the threshold temperature, then method 300 proceeds to 322 to adjust the current and/or voltage being supplied to the winch motor based on motor temperature. The method at 322 is shown in greater detail at FIG. 6, described further below.

At step 316, the winch control module determines if the hook is within a threshold distance of the fairlead. If is the hook is within the threshold distance of the fairlead, then method 300 proceeds to 324 where the winch control module adjusts the current and/or voltage being supplied to the winch motor based on the distance between the hook and fairlead. The method at 324 is shown in greater detail at FIG. 6, described further below.

At step 318, the winch control module determines if the load on the winch is greater than a threshold load. In one example, the threshold load may be a pre-set upper load threshold above which the winch rope may break. If the winch load is greater than the threshold load, then method 300 proceeds to 326 to adjust the current and/or voltage being supplied to the winch motor based on the load threshold (also referred to herein as a load limit). The method at 326 will be described in further detail below with reference to FIG. 4. If the parameters measured in steps 308, 310, and 312 are determined in steps 314, 316, and 318 to not exceed any of their respective thresholds, then method 300 proceeds to step 320 where current and/or voltage continues to be supplied to the winch motor based on the mode input received in step 304. These aforementioned steps for monitoring motor temperature, hook proximity to the fairlead, and load amount may continue to be carried out for the duration of winch operation. If at any point during winch operation, one of the parameters measured in steps 308, 310 and 312 is determined in steps 314, 316, and 318 to exceed its corresponding threshold, then method 300 may immediately proceed to adjust motor operation based on the measured parameter. As an example, if at any point in time it is determined by the winch control module in step 314 that the motor temperature measured in step 308 exceeds the threshold temperature, then method 300 will proceed directly to step 322 and adjust winch motor operation based on the threshold temperature. Thus, in steps 322, 324, and 326, the winch may no longer be operating in the mode originally selected by the user but is instead operating in a reduced performance setting based on the methods described in FIG. 4-6. However, the required motor current and/or voltage needed to support the mode input received in step 304 may be supplied to the winch motor so long as neither motor temperature, load amount, nor hook distance to fairlead exceed (or fall below, as in the case of hook proximity) their threshold values.

It is important to note that the thresholds of steps 322, 324, or 326 may be arrived at simultaneously or consecutively, that is at any time more than one of the parameters being measured in steps 308, 310, and 312 may be determined to be within or above their respective thresholds, as described above at 314, 316, and 318. In this case, steps 322, 324, and 326 may follow a scheduling priority based on which step has the most risk adverse precautionary response to its respective limit being reached. For example, in step 322, in response to motor temperature reaching its upper limit, the current and/or voltage supplied to the motor is reduced to a lower level. The same thing happens in steps 324 and 326, but in response to the hook being within a threshold distance of the fairlead and the load being within a threshold of an upper threshold, respectively. While all steps 322, 324, and 326 involve a reduction in the current and/or voltage supplied to the winch motor, the magnitude of that reduction may be different for each step. For example in step 322, the reduction in the amount of current and/or voltage supplied to the winch motor may be greater than in step 324 or 326 to ensure that the motor does not overheat. Specifically, the step at 322 may include reducing the current and/or voltage supplied to the winch motor to a first level. Step 326 may reduce the amount of current and/or voltage being supplied to the winch motor to a second level to avoid breaking the rope. However, the second level may be higher than the first level. Finally, step 324 may reduce the current and/or voltage supplied to the winch motor to a third level, the third level greater than the second level. The priority system amongst steps 322, 324, 326 may then be determined based on which step involves the greatest reduction in current and/or voltage supplied to the motor. Thus, step 322 takes precedence over steps 324 and 326, and step 326 takes precedence over step 324. If any of steps 322, 324, or 326 are arrived at simultaneously method 300 will determine the step of highest priority and perform the actions described in that step. Said another way, the winch control module may determine the maximum reduction in motor voltage and/or current determined at any of steps 314, 316, and 318 and then adjust the motor based on the maximum reduction value.

Figure 4:
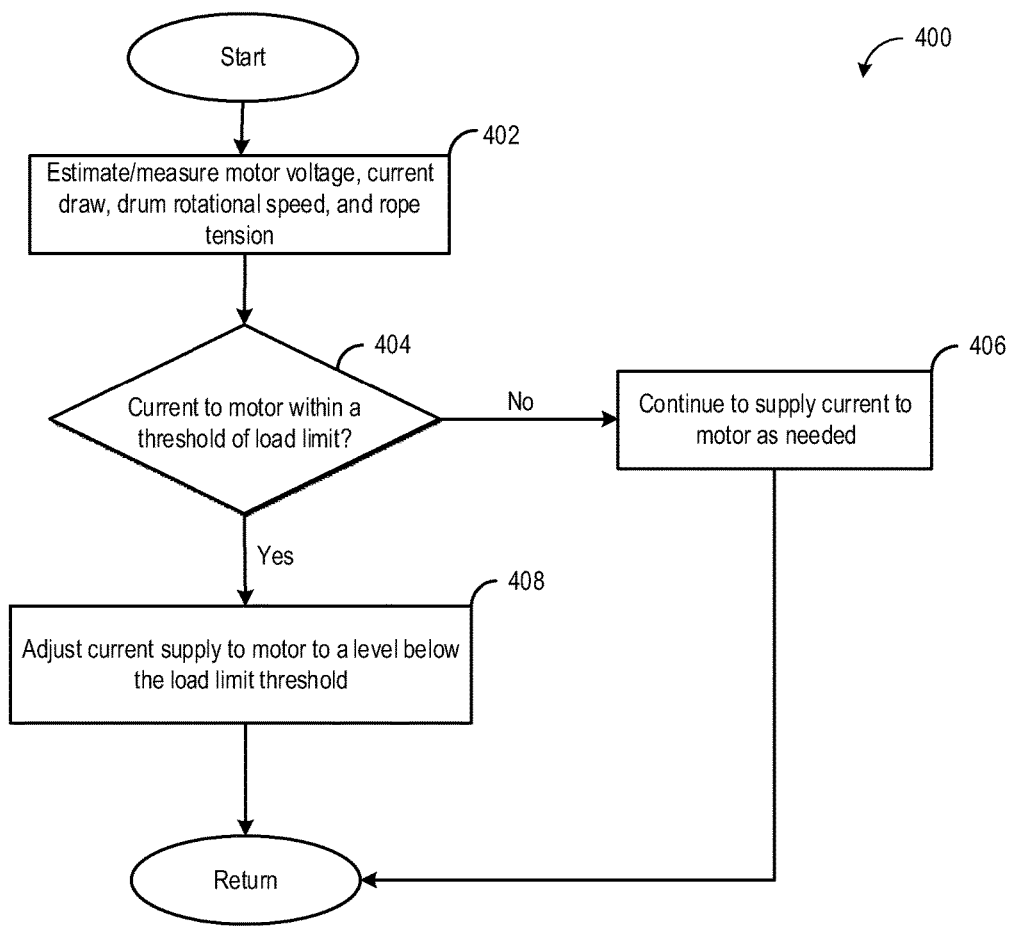
FIG. 4 shows a flow chart of a method for adjusting the pulling force of a winch.

FIG. 4 illustrates a method 400 for adjusting a winch pulling force by adjusting the winch motor based on a pre-set load limit calibrated for a subset of winches. Instructions for carrying out method 400 may be stored in the memory of the winch control module (e.g., winch control module 216 shown in FIG. 2). As such, the winch control module 216 may carry out method 400. Method 400 may continue from step 312 in FIG. 3, described above.

Method 400 begins at 402 by estimating and/or measuring motor voltage, motor current drawn, winch drum rotational speed, and/or rope tension of the winch. In one example, motor current and motor voltage may be measured by a current and voltage sensor (e.g., current and voltage sensor 208) electrically coupled to the winch control module. Motor current may correspond to the pulling force of the winch motor, thereby allowing winch load to be determined based on motor current Limiting the load of the winch below an upper threshold (or load limit), may reduce the risk of breaking the rope wound around the winch drum (e.g., cable 18 shown in FIG. 1). Once the current and/or voltage are measured, method 400 proceeds to step 404 to determine if the measured current is within a threshold of an upper pre-set load limit. If the measured current is within the threshold of the upper pre-set load limit (which may correspond to an upper threshold current), method 400 proceeds to step 408 to reduce the amount of current supplied to the winch motor to a level below the load limit. Otherwise, method 400 proceeds to step 406 and continues to supply current to the winch motor 226 as needed (e.g., as required by a selected winch operational mode).

In one example, the winch load limit may be a pre-determined and fixed value based on calibration testing amongst a subset of winches (e.g., a similar size or type of winch). Thus, the load limit may be tailored to a specific type of winch rather than all types of winches. In another example, a load limit relationship may be pre-determined and pre-programmed into the memory of the winch control module. The load limit may then be adjusted during winch operation based on winch and/or vehicle operating conditions. For example, as vehicle battery voltage decreases, the load limit may also decrease. In yet another example, the load limit may be adjusted by a user via a user interface via a load limit input or based on an activity mode selection (as described further below with reference to FIG. 7). In a further example, the load limit may be set by a vehicle CAN bus (e.g., CAN bus 252 shown in FIG. 2) and/or by vehicle signal wires (e.g., vehicle signal wires 240 shown in FIG. 2).

Figure 5:
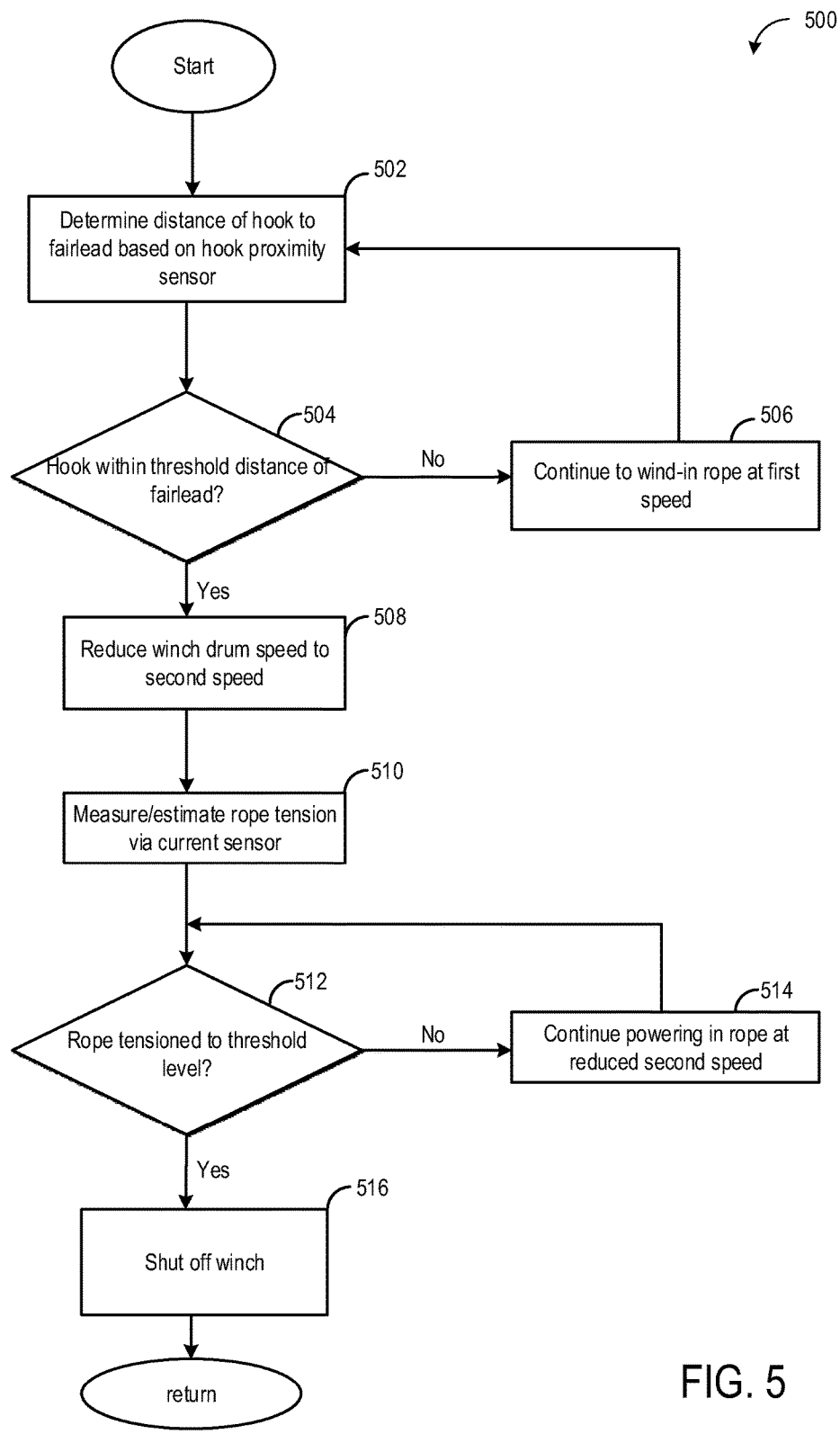
FIG. 5 shows a flow chart of a method for adjusting winch operation based on a hook proximity sensor of the winch.

FIG. 5 shows a method 500 for adjusting the winch motor when the hook is being wound in (e.g., powering-in operation of the winch) and reaches a threshold distance from the fairlead. Method 500 continues from step 310 of FIG. 3.

Method 500 begins with step 502 by determining the distance of the hook to the fairlead based on an output of a hook proximity sensor. In one example, the hook proximity sensor may include a magnetic sensor attached to the fairlead (e.g., fairlead 30 shown in FIG. 1) and a magnet attached to the hook (e.g. hook 28 shown in FIG. 1). At 504, the winch control module determines if the hook is within a threshold distance of the fairlead. In one example, the threshold distance may be set by a vehicle CAN bus (e.g., CAN bus 252 shown in FIG. 2) and/or by vehicle signal wires (e.g., vehicle signal wires 240 shown in FIG. 2). If the hook is not within the threshold distance of the fairlead, then method 500 proceeds to step 506 and continues to wind in the rope (e.g., cable 18 shown in FIG. 1) and hook at first speed. The first speed may be a pre-set rotational speed of the drum (corresponding to a pre-set motor speed). In this case, method 500 reverts back to step 502 and continues to measure the hook distance to the fairlead until the hook does reach the threshold distance. When the threshold distance between the hook and the fairlead has been reached, method 500 continues on to step 508 where the winch control module reduces the speed of the winch drum to a second speed. The second speed is slower than the first speed. Reducing the winch drum speed from the first speed to the second speed may be accomplished by reducing the voltage supplied to the winch motor. Since voltage corresponds to motor speed, reducing the voltage reduces the speed of the winch motor and therefore the drum as well.

Method 500 then proceeds to step 510 where the tension in the rope is estimated by measuring the current from a current sensor and using a known relationship between current and pulling force as explained above. Once the current is measured and the effective rope tension is determined, method 500 proceeds to 512 to determine if the tension in the rope has reached a threshold level. If rope tension is not above the threshold level, then method 500 proceeds to 514 where the cable and hook continue to be wound into the drum at the reduced second speed. Once it is determined that the rope has reached the rope tension threshold level, method 500 proceeds to step 516 where the winch motor is shut off.

Figure 6:
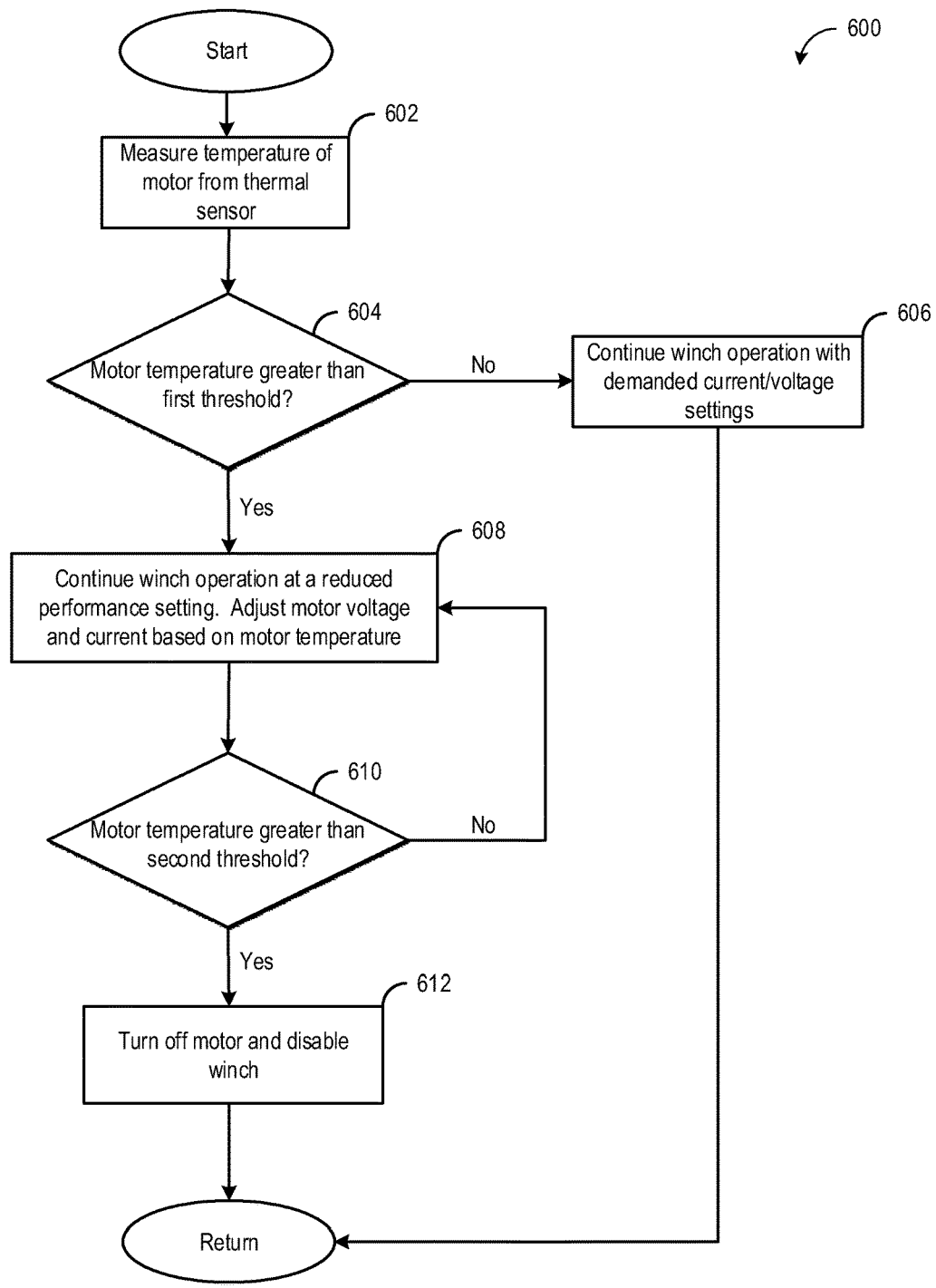
FIG. 6 shows a flow chart of a method for adjusting a winch motor based on a motor temperature.

FIG. 6 illustrates a method 600 for adjusting the winch motor based on a winch motor temperature. Method 600 may continue from step 308 of FIG. 3.

Method 600 begins with step 602 by measuring the temperature of the motor using a thermal sensor (e.g., winch motor thermal sensor 206 shown in FIG. 2) and then proceeds to step 604 to determine if the measured motor temperature exceeds a first threshold temperature. In one example, the first threshold temperature may be set by a vehicle CAN bus (e.g., CAN bus 252 shown in FIG. 2) and/or by vehicle signal wires (e.g., vehicle signal wires 240 shown in FIG. 2). If the motor temperature is not greater than the first threshold temperature, then method 600 proceeds to step 606 and current/voltage continue to be supplied to the winch motor in accordance with demands from user input. However, if measured motor temperature exceeds the first threshold temperature, then method 600 proceeds to step 608 where the current and/or voltage supplied to the winch motor is reduced to some lower level. Thus, instead of being completely shut off, the winch motor continues to operate in step 608, but at a reduced performance setting. At 608, the control module adjusts motor voltage and/or current based on motor temperature, with the motor voltage and/or current decreasing with increasing motor temperature.

Method 600 then proceeds to step 610 to determine if the measured motor temperature has reached a second threshold temperature, the second threshold higher than the first threshold. In one example, the second threshold temperature may be set by the vehicle CAN bus and/or by the vehicle signal wires. If the motor temperature is not greater than the second threshold temperature, then method 600 reverts back to step 608 and continues to supply the winch motor with current and voltage at a reduced pre-set level based on the motor temperature. If the motor temperature has reached (or is above) the second threshold temperature, then method 600 proceeds to 612 to turn off the motor and disable the winch.

Figure 7:
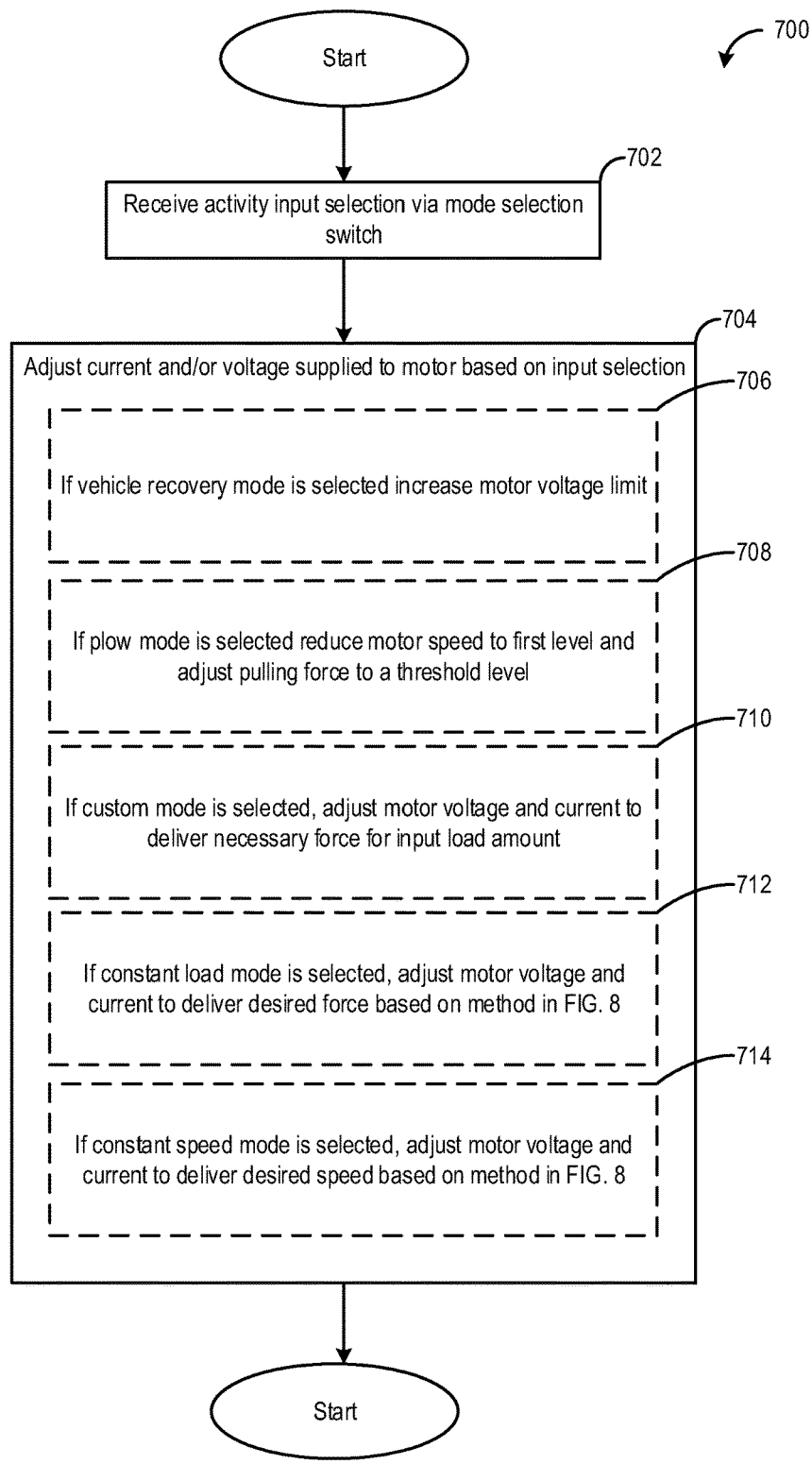
FIG. 7 shows a flow chart of a method for adjusting motor operation of a winch based on a user selection of any one of several pre-programmed performance profiles.
Figure 8:
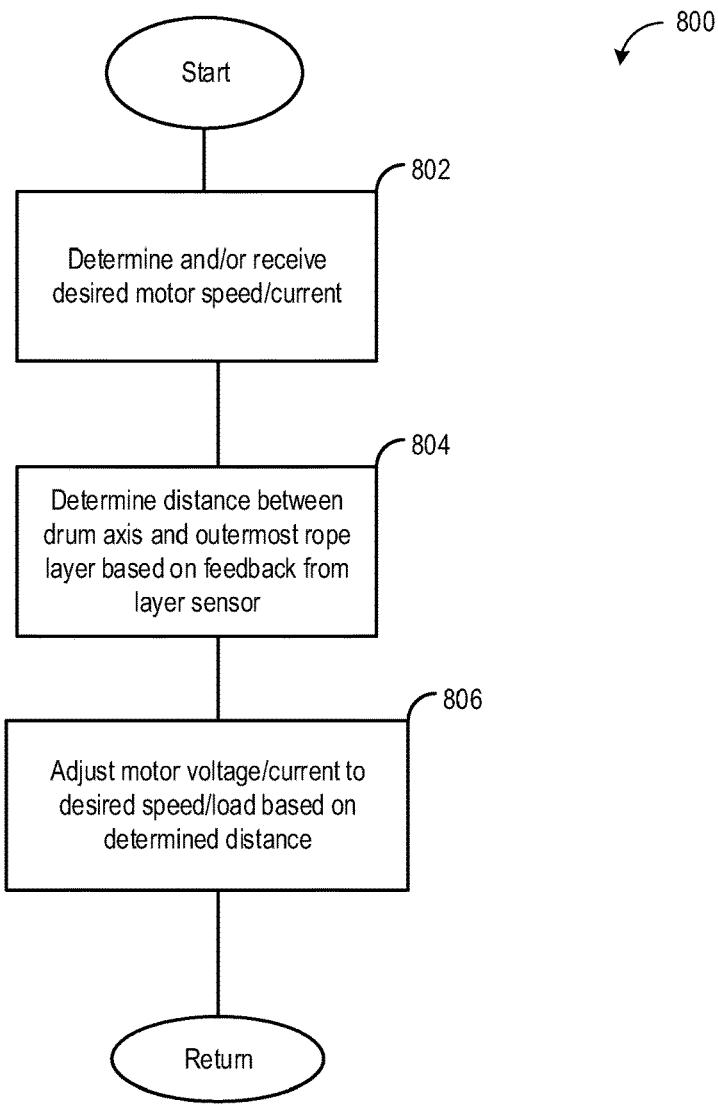
FIG. 8 shows a flow chart of a method for adjusting a winch motor to pull a winch rope at a constant force and/or speed.

FIG. 7 illustrates a method 700 for adjusting the winch motor depending on a selected activity mode of the winch. For example, a user may select any one of several pre-programmed performance profiles or winch activity modes. Each activity mode may include a set of customized winch current, voltage, load, and drum speed operating ranges. Operating parameters for each of the winch activity modes and instructions for operating the winch under each activity mode may be stored within a memory of the winch control module. Method 700 may continue from step 302 of FIG. 3.

Method 700 begins with step 702 with the winch control module receiving an activity mode input selection via an activity mode selection switch. In one example, the activity mode selection switch may be incorporated in the input buttons of the winch user interface. In another example, the activity mode selection switch may be presented via a user interface and then selectable via a single input button. Once the activity mode selection has been received at the winch control module, method 700 proceeds to step 704 where the winch control modules adjusts the current and/or voltage supplied to the winch motor based on the input selection. For example, the winch control module may adjust motor operation based on motor operating ranges and/or thresholds for each activity mode.

Adjustments to motor operation based on example activity modes that may be configured for the winch are shown at 706, 708, 710, 712, and 714. It should be noted that the winch may include additional or alternative activity modes to those described below. At 706, if a vehicle recovery mode is selected, a motor voltage limit (e.g., upper threshold) of the winch motor may be adjusted to a recovery mode voltage limit (e.g., upper threshold). In some examples, the recovery mode voltage limit of the winch motor may be greater than a standard motor voltage limit. Thus, the method at 706 may comprise increasing the motor voltage limit of the winch motor so that the voltage supplied to the winch motor is substantially unrestricted. In this way, increasing the voltage limit of the winch motor may result in maximum winch motor speed so as to recover the vehicle as quickly as possible. In some examples, the method at 706 may include not setting a motor voltage limit on the winch motor in response to the selection of the vehicle recovery mode. Increasing, or removing the motor voltage limit may cause a corresponding increase in the voltage supplied to the winch motor. Therefore, the method at 706 may additionally or alternatively comprise increasing the voltage supplied to the winch motor. In some examples, the voltage supplied to the winch motor may be adjusted to a pre-set vehicle recovery voltage level. In one example, the pre-set vehicle recovery voltage level may be higher than a standard winching operational voltage level.

The method at 706 may additionally include adjusting a motor current limit of the winch motor to a vehicle recovery mode current limit. In some examples, the vehicle recovery mode current limit may be the same as a standard motor current limit which may be based on a load limit of the winch as described above with reference to FIG. 4, and/or a rope (e.g., cable 18 shown in FIG. 1) tension level as described above with reference to FIG. 5. Thus, the standard motor current limit may be a current level above which may result in degradation to the winch and/or may cause the rope to break.

However, in other examples, the vehicle recovery mode current limit may be less than the standard motor current limit. As such, in examples where the vehicle recovery mode current limit is less than the standard motor current limit, the method at 706 may include reducing the current limit from a standard motor current to the vehicle recovery mode current limit. Reducing the current limit may cause a corresponding decrease in the current supplied to the winch motor. Therefore the method at 706 may additionally include reducing the current to the winch motor a pre-set vehicle recovery current level, where the vehicle recovery current level may be lower than a standard winching operation current level.

In another example, the method at 706 may alternatively comprise removing a current limit on the winch motor, so that current supplied to the winch motor may not be restricted in vehicle recovery mode.

If a plow mode is selected, at step 708 the winch control module may reduce winch motor speed to a first level to allow the user finer control of the height of a plow blade which may be configured to be the first accessory 236 as seen in FIG. 2. To do this, the voltage supplied to the winch motor may be reduced to a pre-set first level which may be lower than the standard winching operational voltage. Meanwhile, the winch pulling force may be adjusted to be slightly above the force required to lift the plow blade. The amount of current required to provide such force may be pre-determined based on testing and calibrating a subset of winches.

If a custom load mode is selected, at step 710, the winch control module adjusts motor operation based on a load input by the user. For example, the user may input any desired load amount via input buttons of a winch user interface. The control module may then adjust the current and/or voltage supplied to the winch motor to deliver the force required for the input load amount. The current necessary to deliver the desired pulling force may be estimated by the winch control module 216 using a known relationship between motor current and pulling force. It is important to note that the user may not be allowed to input a load amount exceeding the upper pre-set load limit as described in method 400 of FIG. 4.

If a constant load mode is selected, at step 712, the winch control module may adjust the current and/or voltage supplied to the winch motor based on method 800 described in FIG. 8, which relies on feedback from a sensor such as a current and/or voltage sensor to ensure that the winch pulling force remains substantially constant.

If a constant speed mode is selected, at step 714, the winch control module may adjust the current and/or voltage supplied to the winch motor based on method 800 described in FIG. 8, which relies on feedback from a sensor such as an angular position to ensure that the winch motor speed remains substantially constant.

FIG. 8 shows a method 800 of adjusting current and/or voltage to the winch motor such that its speed and/or pulling force on the rope (e.g., cable 18 shown in FIG. 1) are constant. Method 800 may continue from step 712 or 714 in FIG. 7 after receiving a user selection of a constant load or constant speed mode. Method 800 includes determining both the speed of the rope and the pulling force being exerted on said rope based on an estimated amount of rope wound around the winch drum.

Method 800 begins at step 802 by receiving a desired constant motor speed or pulling force from user input via the input buttons 234. In one example, the desired constant motor speed or pulling force may additionally be received via user input of one of the activity modes, the selected activity mode including a pre-set constant motor speed and/or pulling force. Once this information is received by the winch control module, method 800 proceeds to step 804 where the winch control module determines the distance between the winch drum rotational axis (e.g., central axis of the drum) and the outermost layer of rope on the winch drum. One way to determine this distance may be by means of an angular position sensor which could be placed either on the winch drum, or on the winch motor shaft. By counting the number of rotations of the winch drum, and knowing both the thickness of the rope and the radius of the winch drum, the winch control module may be able to estimate the distance from the drum axis to the outermost layer of rope. In one example, determining this distance may be done by multiplying the thickness of the rope by the number of rotations of the drum as measured by the angular position sensor, and then adding this to the known radius of the winch drum. This calculation could be done by an algorithm pre-programmed into the winch control module. Once this distance has been determined, method 800 proceeds to step 806 to adjust the voltage and/or current supplied to the winch motor based on the determined distance of winch drum axis to outermost layer of cable as determined from step 804. In other embodiments, alternative sensors may be used to determine the distance between the drum axis and outermost layer of rope wound around the winch drum. What follows next is an explanation of how the current/and or voltage may be adjusted.

In order for the rope to be pulled in or let out at a constant speed, motor speed and therefore winch drum speed must be adjusted by means of voltage control since voltage directly corresponds to motor speed. If the position at which the rope is pulled in or let out were fixed, then it would always move at a constant speed so long as the winch drum rotated at a constant speed. But, the winch rope is instead wound around the drum, thereby changing the amount of rope wound around the drum. As an example, if all the rope is wound around the winch, the outermost layer of rope is farther away from the central drum axis than the innermost layer of cable. If the winch motor is then powered to let out the rope, for each rotation of the drum, the outermost layer of rope has to move a greater distance than the innermost layer and thus the outermost layer of rope has a greater speed than the innermost layer of rope. In other words, a constant rotational speed of the winch drum does not translate to constant linear speed of the rope, because the effective turning radius changes depending upon how much rope is wound around the drum. Thus, if in the example above, the rope were to be unwound from the drum at a constant speed, the drum's rotational speed would have to start at some level and gradually increase as the cable unwinds. A relationship may be pre-programmed into the winch control module to estimate the voltage required to adjust the rotational speed of the drum such that the linear speed of the rope is kept substantially constant. This relationship may use feedback from the angular position sensor as to the amount of rope wound around the drum in order to estimate the effective turning radius of the drum and therefore the linear speed of the unwound rope.

To provide a constant pulling force, a similar method may be used. The torque and therefore pulling force exerted on the unwound portion of the rope by the winch drum is a function of the distance from the drum axis to the outermost layer of rope wound on the drum. The bigger this distance, the greater the torque. As an example, if the rope is being wound into the drum, and the current being supplied to the winch motor is constant, the pulling force exerted on the unwound portion of rope will increase as the rope continues to be wound in because the distance between the drum rotational axis and the outermost layer of rope will increase as more and more rope is wound around the drum. Thus, a relationship may be pre-programmed in the winch control module to determine the effective pulling force on the rope based on the distance from the drum rotational axis to the outermost layer of rope as determined by feedback from the angular position sensor. The winch control module may then determine how the current supplied to the winch motor should be adjusted to maintain the constant pulling force based on the change in torque exerted on the rope as it is either wound in or out.

In this way, winch operation may be tailored to match the specific needs of a plurality of winch activities while at the same time offering a set of safety measures that protect not only the user, but also the winch and its parts from damage. A non-adjustable winch may perform poorly for activities demanding speeds and pulling forces different than what it was programmed for. The current invention however, may provide increased performance across a range of activities. For example, when lifting a plow blade, traditional winches may lift the plow blade too fast for a user to have much control over the blade because the voltage being supplied to the winch motor is not adjustable. Instead, by operating in a plow mode, different than a standard winching mode, as described above, the voltage delivered to the winch motor may be reduced to a level that would allow finer control of the plow blade. Not only would users be allowed to select from a range of activity modes with pre-set power settings appropriate for that activity, but the user would also be able to create custom modes which would allow them to input specific load amounts so that the winch performance could be further optimized for any load amount. In addition, the constant speed and load modes would offer a benefit to users when they want to pull something, for example a fence, and stretch it without breaking it. Not only would the present invention offer an adaptable winch, but it would also offer a safer winch, less prone to damage. Several pre-set safety thresholds (e.g., load, temperature, and hook proximity) may be established for the winch such that if these safety thresholds are reached during operation, the winch control module may automatically engage in precautionary measures. For example, if motor temperatures reach a certain threshold, power supplied to the motor may be reduced so as to not overheat and damage the motor, while still allowing the user to operate the winch at a reduced performance setting. If motor temperature reaches an even higher upper threshold, then the motor is powered off to reduce damage to the motor. By adjusting winch motor operation based on threshold operational ranges, along with selected activity mode setting, a technical effect of the invention is achieved and the lifetime of the winch may be increased. As a result, the winch may also be optimized for performance across a range of activities, and equipped with mechanisms for increased safety and longevity.

As one embodiment, a system for a winch comprises a controller adapted to adjust operation of a motor of the winch based on a load limit, the load limit automatically set by the controller to different levels depending on a mode of the winch. For example, the controller may include computer readable instructions stored within a non-transitory memory of the system for adjusting operation of the motor of the winch as explained above and below. As one example, the mode is based on an operator-selected mode from among a limited set of available modes. For example, the available modes may include each of a winching mode and a plowing mode. In another example, the available modes may include each of a winching mode, a plowing mode, a constant load mode, and a constant speed mode. The load limit may correspond to an upper threshold current supply to the motor and the controller may be further adapted to adjust one or more of the current supply or voltage of the motor to a level below the load limit.

In one example, the mode is received by the controller from a user interface of the winch via an activity mode selection selected via a user, the activity mode selection including one or more of a pre-set motor voltage operating range or motor current operating range, the motor voltage operating range corresponding to a motor speed range and the current operating range corresponding to a motor pulling force range. In another example, the activity mode selection includes one of a vehicle recovery mode including an increased motor voltage limit compared to a standard winch operating motor voltage limit, a plow mode including instructions to operate the motor at a first speed and adjust the motor to a threshold pulling force, the first speed lower than a standard winch operating motor speed, a custom mode including instructions to operate the motor to deliver a pulling force based on the load limit, a constant load mode including instructions to adjust a voltage and current supply to the motor in order to deliver a constant load input by the user, and a constant speed mode including instructions to adjust a voltage and current supply to the motor in order to deliver a constant speed input by the user.

In another example, the controller is further adapted to adjust one or more of the voltage and current supply to the motor based on a distance between a rotational axis of the drum and an outermost rope layer wound around the drum when the winch is operating in one of a constant speed mode or constant load mode. In another example, the controller is further adapted to adjust operation of the motor based on a distance of a hook coupled to an end of a rope of the winch to a winch fairlead, the distance of the hook to the winch fairlead based on an output of a hook proximity sensor positioned on the hook and winch fairlead, where the adjusting operation of the motor based on the distance of the hook includes adjusting one or more of a current or voltage supply of the motor in order to reduce a speed of the drum from a first speed to a second speed in response to the hook being within a threshold distance of the winch fairlead, the second speed lower than the first speed. In yet another example, the controller is further adapted to turn off the motor when a rope tension of the rope is at or above threshold level, the rope tension based on a current supply to the motor. In another example, the controller is further adapted to: in response to a temperature of the motor increasing above a first threshold level, operate the motor at a reduced performance setting and adjust one or more of a voltage and current supply to the motor based on the temperature of the motor. In yet another example, the controller is further adapted to: decrease one or more of the voltage and current supply to the motor as the temperature of the motor increases further above the first threshold level; and turn off the motor and disable the winch in response to the temperature of the motor increasing above a second threshold level, the second threshold level higher than the first threshold level.

As another embodiment, a method for a winch comprises adjusting a motor of the winch based on a pre-set load limit of the winch; receiving a user input including a second load limit at a user interface of the winch; adjusting the motor of winch based on the user input including the second load limit and not based on the pre-set load limit if the second load limit is different than the pre-set load limit; and further adjusting the motor based on one or more of a first distance of a hook of the winch from a winch fairlead, a temperature of the motor, and a second distance from a central axis of a drum of the winch to an outer layer of a rope of the winch. As one example, the pre-set load limit is one or more of an upper threshold supply current or voltage to the motor and the pre-set load limit is a calibrated load limit for a subset of winches.

In another example, the method further comprises decreasing one or more of a current or voltage supplied to the motor from a first level to a second level when the temperature of the motor is greater than a first threshold temperature, the second level decreasing with increasing temperature of the motor. The method may further comprise disabling the motor when the temperature of the motor is greater than a second threshold temperature, the second threshold temperature greater than the first threshold temperature. In yet another example, the hook is positioned at an end of a rope of the winch, the rope wound around the drum of the winch and the method may further comprise reducing a speed of the motor from a first speed to a second speed in response to the first distance being less than a first threshold distance. In another example, the method comprises disabling power to the motor when the rope is tensioned to a threshold level and adjusting one or more of a voltage or current of the motor based on the second distance in order to maintain a constant desired motor speed or load. As an example, the constant desired motor speed load is one of a constant motor speed or load input manually by a user at a user interface of the winch or a constant motor speed or load corresponding to an activity mode selected by the user at the user interface.

As yet another embodiment, a winch comprises a drum including a rope wound around an outer surface of the drum; a motor driving rotation of the drum about a central axis; and a controller adapted to adjust one or more of a speed and pulling force of the motor based on a temperature of the motor and a user input at a user interface of the winch, the user input including motor operating parameters. In one example, the winch further includes a hook positioned at an end of the rope and a fairlead positioned in front of the drum and the controller is further adapted to adjust one or more of the speed and pulling force of the motor based on a first distance of the hook from the fairlead and a second distance from the central axis to an outer layer of the rope around the drum. In another example, the motor operating parameters include one or more of a load limit, an upper threshold motor voltage, an upper threshold motor current, or a motor speed.

It will be appreciated that the configurations and routines disclosed herein are exemplary in nature, and that these specific embodiments are not to be considered in a limiting sense, because numerous variations are possible. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system for a winch, comprising:
   a controller adapted to adjust operation of a motor of the winch based on a load limit, the load limit automatically set by the controller to different levels depending on a mode of the winch, wherein the load limit corresponds to one or more of an upper threshold voltage supply and an upper threshold current supply to the motor.

2. The system of claim 1, wherein the mode is based on an operator-selected mode from among a limited set of available modes.

3. The system of claim 2, wherein the limited set of available modes includes each of a winching mode and a plowing mode.

4. The system of claim 2, wherein the limited set of available modes includes each of a winching mode, a plowing mode, a constant load mode, and a constant speed mode.

5. The system of claim 1, wherein the load limit corresponds to the upper threshold current supply to the motor, and wherein the controller is further adapted to adjust one or more of a voltage supply and a current supply to the motor to a level below the load limit.

6. The system of claim 1, wherein an indication of the mode is received by the controller from a user interface of the winch via an activity mode selection selected via a user, the activity mode selection including one or more of a pre-set motor voltage operating range and a pre-set motor current operating range, the pre-set motor voltage operating range corresponding to a motor speed range and the pre-set motor current operating range corresponding to a motor pulling force range.

7. The system of claim 6, wherein the activity mode selection includes one of a vehicle recovery mode including instructions to operate the motor at an increased motor voltage limit compared to a pre-set winch operating motor voltage limit, a plow mode including instructions to operate the motor at a first speed and adjust the motor to a threshold pulling force, the first speed lower than a pre-set winch operating motor speed, a custom mode including instructions to operate the motor to deliver a pulling force based on the load limit, a constant load mode including instructions to adjust a voltage supply or a current supply to the motor in order to deliver a constant load input by the user, and a constant speed mode including instructions to adjust the voltage supply or the current supply to the motor in order to deliver a constant speed input by the user.

8. The system of claim 1, wherein the controller is further adapted to adjust one or more of a voltage supply and a current supply to the motor based on a distance between a rotational axis of a drum and an outermost rope layer wound around the drum when the winch is operating in one of a constant speed mode or constant load mode.

9. The system of claim 1, wherein the controller is further adapted to adjust operation of the motor based on a distance of a hook coupled to an end of a rope of the winch to a winch fairlead, the distance of the hook to the winch fairlead based on an output of a hook proximity sensor positioned on the hook and winch fairlead, wherein the adjusting operation of the motor based on the distance of the hook includes adjusting one or more of a voltage supply and a current supply to the motor in order to reduce a speed of a drum from a first speed to a second speed in response to the hook being within a threshold distance of the winch fairlead, the second speed lower than the first speed.

10. The system of claim 1, wherein the controller is further adapted to turn off the motor when a rope tension of a rope is at or above a threshold level, the rope tension determined based on a current supply to the motor.

11. The system of claim 1, wherein the controller is further adapted to: in response to a temperature of the motor increasing above a first threshold level, operate the motor at a reduced performance setting and adjust one or more of a voltage supply and a current supply to the motor based on the temperature of the motor.

12. The system of claim 11, wherein the controller is further adapted to:
decrease one or more of the voltage supply and the current supply to the motor as the temperature of the motor increases further above the first threshold level; and
turn off the motor and disable the winch in response to the temperature of the motor increasing above a second threshold level, the second threshold level higher than the first threshold level.

13. A method for a winch, comprising:
adjusting a motor of the winch based on a pre-set load limit of the winch, wherein the pre-set load limit corresponds to one or more of an upper threshold voltage supply and an upper threshold current supply to the motor;
receiving a user input including a second load limit at a user interface of the winch;
adjusting the motor of the winch based on the user input including the second load limit and not based on the pre-set load limit if the second load limit is different than the pre-set load limit; and
further adjusting the motor based on one or more of a first distance of a hook of the winch to a winch fairlead, a temperature of the motor, and a second distance from a central axis of a drum of the winch to an outer layer of a rope of the winch.

14. The method of claim 13, wherein the pre-set load limit is a calibrated load limit for a subset of winches.

15. The method of claim 13, further comprising decreasing one or more of a voltage supply and a current supply to the motor from a first level to a second level when the temperature of the motor is greater than a first threshold temperature, the second level decreasing with increasing temperature of the motor, and further comprising disabling the motor when the temperature of the motor is greater than a second threshold temperature, the second threshold temperature greater than the first threshold temperature.

16. The method of claim 13, wherein the hook is positioned at an end of a rope of the winch, the rope wound around the drum of the winch and further comprising reducing a speed of the motor from a first speed to a second speed in response to the first distance being less than a first threshold distance.

17. The method of claim 13, further comprising disabling power to the motor when the rope is tensioned to a threshold level and further comprising adjusting one or more of a voltage supply and a current supply to the motor based on the second distance in order to maintain a constant desired motor speed or load and wherein the constant desired motor speed or load is one of a constant motor speed or load input manually by a user at a user interface of the winch or a constant motor speed or load corresponding to an activity mode selected by the user at the user interface.

18. A winch, comprising:
a drum including a rope wound around an outer surface of the drum;
a motor driving rotation of the drum about a central axis; and
a controller adapted to adjust one or more of a speed and pulling force of the motor based on a temperature of the motor and a user input at a user interface of the winch, the user input including motor operating parameters.

19. The winch of claim 18, wherein the winch further includes a hook positioned at an end of the rope and a fairlead positioned in front of the drum and wherein the controller is further adapted to adjust one or more of the speed and pulling force of the motor based on a first distance of the hook from the fairlead and a second distance from the central axis to an outer layer of the rope around the drum.

20. The winch of claim 18, wherein the motor operating parameters include one or more of a load limit, an upper threshold motor voltage, an upper threshold motor current, or a motor speed.

* * * * *